United States Patent [19]

McWhorter

[11] 4,266,443

[45] May 12, 1981

[54] ARTICULATING GUIDE SPRING

[76] Inventor: Edward M. McWhorter, 6931 Greenbrook Cir., Citrus Heights, Calif. 95610

[21] Appl. No.: 922,490

[22] Filed: Jul. 6, 1978

[51] Int. Cl.³ .............................................. G05G 1/00
[52] U.S. Cl. .................................... 74/579 E; 74/581
[58] Field of Search ............................ 74/579 E, 581; 123/197 AB, 197 AC

[56] References Cited

U.S. PATENT DOCUMENTS

| 2,726,555 | 12/1955 | McGrath | 74/581 |
| 4,089,235 | 5/1978 | McWhorter | 74/579 E |

Primary Examiner—Louis Rimrodt

[57] ABSTRACT

The invention relates to new and useful improvements in the pivotal movement of the intra-articulate connecting rod used in reciprocating heat engines and positive displacement pumps and compressors. The device described is a small spring which is used to hold the articulating components in the toggled or untoggled configuration during periods when the system is free of dynamic operating loads or static friction loads when the system is not in operation. The purpose of the spring during engine operation is to guide the pivotal movement of the intra-articulating connecting rod and thus provide a smoother and more positive action particularly at low speed.

2 Claims, 5 Drawing Figures

ARTICULATING GUIDE SPRING

CROSS REFERENCE

The articulating spring guides presented are designed to be used specifically with my U.S. Pat. No. 4,089,235 "Intra-Articulate Connecting Rod for Small Engines" May 16, 1978 and my copending patents Ser. No. 836,037 "Five Bar Reciprocating Engine System" filed Aug. 23, 1977 and Ser. No. 911,688 "Intertial Connecting Rod" filed June 1, 1978.

BACKGROUND OF THE INVENTION

1. Field of the Invention

This invention relates to the field of articulating connecting rods and in particular to the generic species classified as intra-articulating systems.

2. Description of Prior Art

Intra-articulating connecting rods are most generally treated as independent or freely pivoting mechanisms. That is, the pivoting motion between the upper and lower connecting rod is independent of the construction or design of the associated linkage and therefore relies entirely on the system dynamics for actuation during the reciprocating process. The dynamic loads operating upon the system are a mixture of rotational and translational inertial forces acting at each end of the connecting rod. When the pivot point between the upper and lower connecting rod is located near the piston end the actuating forces are primarily translational in nature. When the pivot point is located at the other end of the connecting rod assembly, near the crankpin, the actuating forces are predominantly tangential and radial components of the crankshaft rotary motion.

I have discovered that the pivotal action between the upper and lower connecting rod is smoother when the system is weakly guided by a spring which supplies a tensile or compressive load between the two members. I prefer that this spring load be applied to some systems in a manner which tends to keep them in the untoggled configuration while in other systems I prefer the spring action to be applied in a manner which will tend to keep the system in the toggled configuration.

When the lower member of the connecting rod is designed as an eccentric, moving within the major journal of the upper connecting rod, the spring action can be provided by a flat or leaf type spring. The rotation can also be guided by coil or torsional springs. In either case the effect of the spring action upon the rotation of the eccentric within the connecting rod major journal is the same, that is, it reduces the tendency of the eccentric to flutter at each end of its travel.

In the starting operation of internal combustion engines the spring action provides a more positive force to the piston and therefore increases the reliability of ignition at the lower speed. In compressor and pump operations the spring action provides a smoother transitional period of acceleration during startup and shutdown and can be instrumental in the damping of resonant harmonic oscillations.

SUMMARY OF THE INVENTION

The primary object of the invention is to provide in a manner hereinafter setforth a spring mechanism to be used as a guiding force in the toggling or actuating motion of intra-articulating connecting rods and thus smooth the reciprocating action.

Another object of the invention is to provide a more reliable method of ignition of internal combustion engines during the lower engine speed at start up.

It is yet another object of the invention to provide a method of smoothing the transitional acceleration of reciprocating components of pumps and sompressors.

Still another object of the invention is to provide a method of damping the resonant harmonic oscillations occuring in eccentric operating intra-articulating systems.

All of the foregoing and still further objects and advantages of the invention will become apparent from a study of the drawings and specifications presented.

BRIEF DESCRIPTION OF THE DRAWINGS

There are included as part of the specification, drawings which show the application of spring devices on the various types of reciprocating mechanism described in the cross-references to which this invention is specific.

DESCRIPTION OF THE PREFERRED EMBODIMENTS

Figure 1:
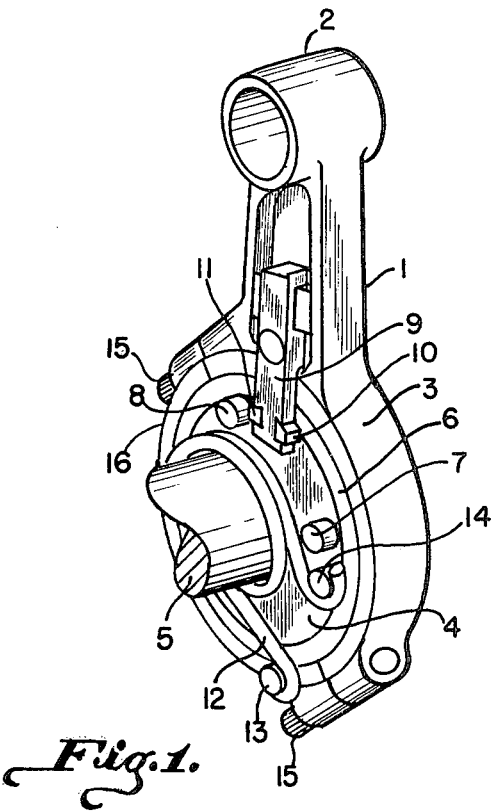
FIG. 1 is a perspective view of an intra-articulate connecting rod of the rotational actuating type showing the application of a leaf spring used to retard the pivotal motion of the eccentric component upon the crankpin.

Referring now to the drawing and to FIG. 1 thereof in particular. The elements of the connecting rod shown in FIG. 1 are as follows. Connecting rod 1 comprises an upper journal 2 for pivotally mounting a piston and a lower major journal 3 for mounting an eccentric 4. The eccentricity of eccentric 4 acts as the lower arm of the articulating two piece connecting rod in this design. The eccentric 4 is rotatively mounted on crankpin 5 depicted as a cross-section. An intervening bearing 6 is placed between eccentric 4 and major journal 3 which allows the eccentric 4 to pivot on crankpin 5. The pivot motion is restricted to a sector located between two pins fixedly attached to eccentric 4. These pins are termed "bumpers" and are designated as elements 7 and 8. Bumpers 7 and 8 strike against striker 9 which contains resilient elements 10 and 11 which are called impactors. The resiliency of the impactor deaden the impact of the bumpers against the striker and thus reduce the noise level of the system.

I have discovered that the connecting rod shown in FIG. 1 can be improved by applying a slight spring load to the movement of the eccentric 4. In FIG. 1 the spring load is applied with a torsional spring 12 which encircles the crankpin 5 but does not touch it. One end of torsional spring 12 is fixedly attached to the major journal 3 at pin 13 and to pin 14 fixedly attached to eccentric 4 at the other end. In this particular application the torsional spring 12 force is applied in a manner which tends to keep the connecting rod in the shortened or toggled configuration. Other elements shown in FIG. 1 are bolts 15 which hold the lower bearing cap 16 of the major journal 3.

Those skilled in the art will recognize the fact that a tension spring could be used in place of the torsional spring shown with the same results.

Figure 2:
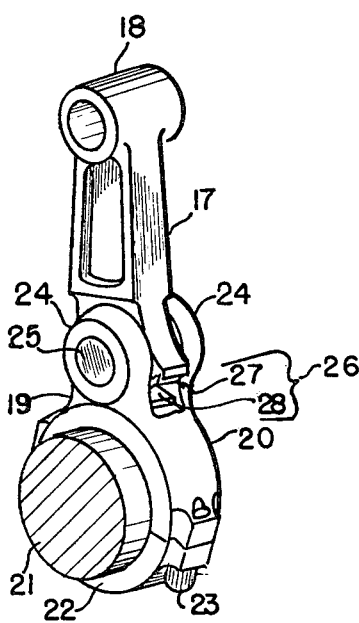
FIG. 2 is a perspective view of an intra-articulate connecting rod principally of the rotational actuating type showing the application of a flat leaf spring at the pivot.

Turning now to another type of intra-articulate system as shown in FIG. 2. FIG. 2 is an intra-articulating connecting rod which is principally of the rotational actuating type. The elements of this system are the upper connecting rod 17 containing a journal 18 for pivotally mounting a piston and a lower connecting rod 19 containing a major journal 20. The major journal 20 is rotatively mounted on crankpin 21, which is depicted in cross-section, by bolting bearing cap 22 with bolts 23 to the major journal 20. The upper connecting rod 17 is pivotally journaled in the lower connecting rod 19 toggle journals 24 by pivot pin 25. The upper connecting rod 17 is free to pivot in pivot journals 24 by the distance depicted as element 26. The angular travel of the pivoting action depicted is approximately 30 degress. At each end of the pivoting action the angular change is halted by resilient impactors 27 fixedly attached to the upper connecting rod 17 which intermittantly contact the lower connecting rod 19. A leaf spring 28, which is shaped in the form of a "V", is fixedly attached to the upper connecting rod and is only partially shown in this view. In this particular application leaf spring 28 tends to keep the connecting rod in the straightened or untoggled configuration.

Figure 3:
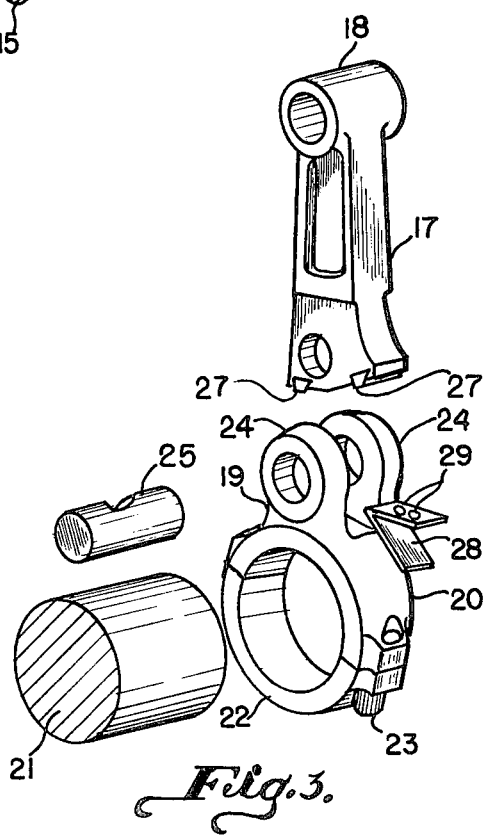
FIG. 3 is a perspective view of the mechanism shown in FIG. 2 in expanded form showing the detail of the leaf spring.

A perspective view of leaf spring 28 is presented as FIG. 3. Holes 29 in the top of leaf spring 28 are for attaching with screws on to the upper connecting rod 17.

Figure 4:
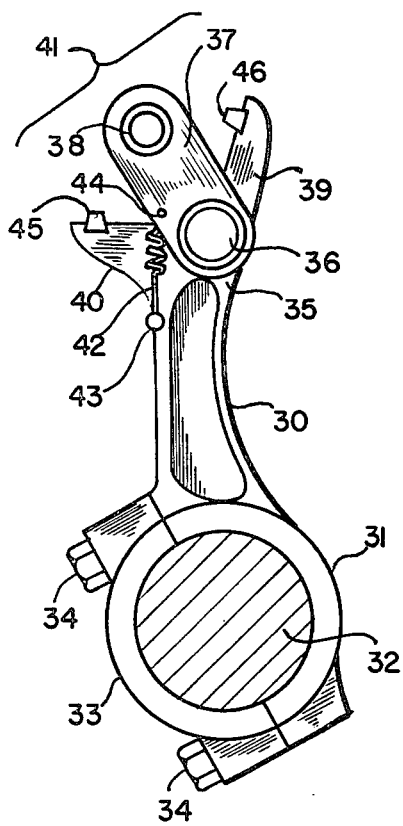
FIG. 4 is a side view of an intra-articulate connecting rod principally of the translational actuating type showing the application of tension springs at the pivot.

Turning now to another type of intra-articulating connecting rod which is shown in FIG. 4. Connecting rod 30, shown in FIG. 4, is a translational actuating type. That is, the translational inertial forces of the piston are the predominant actuating forces. Connecting rod 30 comprises a major journal 31 which is rotatively mounted on crankpin 32, which is depicted in cross-section, by bolting on bearing cap 33 with bolts 34. At the other end of connecting rod 30 is a pivot journal 35 holding a pivot pin 36. Arms 37 forming the upper connecting rod are pivotally mounted on each side of pivot pin 36 at one end and hold the piston pin 38, shown in cross-section. The pivoting action of arms 37 are restricted by extensions 39 and 40 which are fixedly attached to pivot journal 35. Extensions 39 and 40 contact piston wrist pin 38 and restrict the pivoting action of arms 37 to that sector depicted by numerical character 41.

The reciprocating guide spring 42 in this type of connecting rod is mounted over the pivot pin 36 and fixedly attached to pin 43 fixedly attached to extension 40 at one end and at the other end to pin 44 which is fixedly attached to arms 37. The springs 42 shown in FIG. 6 are the circular tensile type spring and is shown partially extended in order not to obscure the view of extension 40. The normal position of arms 37 would be to hold piston wrist pin 38 against resilient impactor 45. In the extended or untoggled configuration piston wrist pin 38 would be in contact with resilient impactor 46 fixedly attached to extension 39. In this position springs 42 would be in the fully extended condition.

Figure 5:
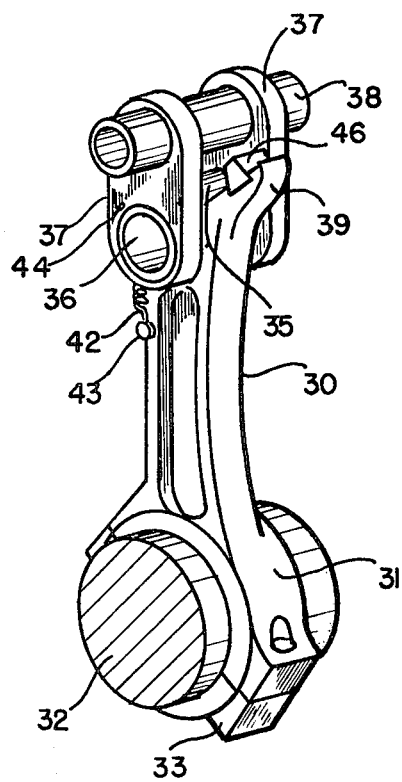
FIG. 5 is a perspective view of the connecting rod shown in FIG. 4.

FIG. 5 is perspective view of FIG. 4 and is presented for reader reference and clarity.

The invention presented is a series of different types of springs for application specifically to the intra-articulating type of connecting rods shown in FIGS. 1, 2 and 4. Those skilled in the art will recognize the fact that, torsional, leaf, or tension tyes of springs could be used interchangeably in each instance. The type of spring design used is therefore an optional design feature in which the major consideration is the available spacial envelope necessary to mount the spring. It is therefore the primary intention of this invention to apply a spring force at the pivoting joint of the intra-articulating components which will tend to guide their movement during operation of the reciprocating assembly.

What is claimed is:

1. In connecting rods of the character described, an upper connecting rod pivotally attached to a lower connecting rod at a pivoting joint, a spring fixedly attached to the said upper connecting rod and to the said lower connecting rod at points above and below the said pivoting point respctively, said spring being under strain in a manner which tends to keep the said upper connecting rod and the said lower connecting rod in the untoggled condition relative to the said pivoting joint.

2. In connecting rods of the character described, an upper connecting rod pivotally attached to a lower connecting rod at a pivoting joint, a spring fixedly attached to the said upper connecting rod and to the said lower connecting rod at points above and below the said pivoting joint respectively, said spring being under strain in a manner which tends to keep the said upper connecting rod and the said lower connecting rod in the toggled condition relative to the said pivoting joint.

* * * * *